(12) United States Patent
Sigmund et al.

(10) Patent No.: US 8,489,074 B2
(45) Date of Patent: Jul. 16, 2013

(54) SYSTEMS AND METHODS FOR PROVIDING ENHANCED VOICEMAIL SERVICES

(75) Inventors: William Joseph Sigmund, Cumming, GA (US); Michael Robert Zubas, Marietta, GA (US); Brian Keith Rainer, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 220 days.

(21) Appl. No.: 12/477,971

(22) Filed: Jun. 4, 2009

(65) Prior Publication Data

US 2009/0239507 A1 Sep. 24, 2009

Related U.S. Application Data

(63) Continuation of application No. 12/201,945, filed on Aug. 29, 2008.

(60) Provisional application No. 60/969,419, filed on Aug. 31, 2017.

(51) Int. Cl.
*H04M 11/10* (2006.01)

(52) U.S. Cl.
USPC .......................... 455/413; 455/412.1; 455/403

(58) Field of Classification Search
USPC ........... 455/413, 412.1, 403; 379/67.1, 88.22, 379/88.23, 88.25, 88.26
See application file for complete search history.

(56) References Cited

U.S. PATENT DOCUMENTS

| | | |
|---|---|---|
| 5,329,579 A | 7/1994 | Brunson |
| 5,524,137 A | 6/1996 | Rhee |
| 5,572,578 A | 11/1996 | Lin et al. |
| 5,737,394 A | 4/1998 | Anderson et al. |
| 5,737,395 A | 4/1998 | Irribarren |
| 5,809,111 A | 9/1998 | Matthews |
| 6,005,870 A | 12/1999 | Leung et al. |

(Continued)

FOREIGN PATENT DOCUMENTS

| | | |
|---|---|---|
| EP | 0 631 452 | 12/1994 |
| EP | 1 113 631 | 7/2001 |

(Continued)

OTHER PUBLICATIONS

U.S. Notice of Allowance dated May 26, 2011 in U.S. Appl. No. 12/201,945.

(Continued)

*Primary Examiner* — Chuong A Ngo
(74) *Attorney, Agent, or Firm* — Hope Baldauff Hartman, LLC

(57) ABSTRACT

A method for operating a mobile device to set a voicemail greeting includes providing the mobile device with a memory for storing a visual voicemail (VVM) application, an I/O interface, and a microphone for receiving an audio input. The method further includes: receiving a selection for an option to record the voicemail greeting, receiving the audio input, recording the audio input as the voicemail greeting for a voicemail account associated with the mobile device, storing the recorded voicemail greeting in the memory, and generating a request that includes the recorded voicemail greeting, a network address for a VVM system, and instructions to set the voicemail greeting as an active voicemail greeting for the voicemail account. The method further includes transmitting the request to the VVM system and receiving a response from the VVM system that includes an indication of whether the voicemail greeting was set as the active voicemail greeting.

15 Claims, 10 Drawing Sheets

U.S. PATENT DOCUMENTS

| | | | |
|---|---|---|---|
| 6,108,559 | A | 8/2000 | Astrom et al. |
| 6,148,212 | A | 11/2000 | Park et al. |
| 6,246,871 | B1 | 6/2001 | Ala-Laurila |
| 6,335,962 | B1 | 1/2002 | Ali et al. |
| 6,351,523 | B1 | 2/2002 | Detlef |
| 6,360,272 | B1 | 3/2002 | Lincke et al. |
| 6,480,885 | B1 | 11/2002 | Olivier |
| 6,522,727 | B1 | 2/2003 | Jones |
| 6,751,298 | B2 | 6/2004 | Bhogal et al. |
| 6,829,334 | B1 | 12/2004 | Zirngibl |
| 6,879,847 | B1 | 4/2005 | Kato |
| 6,912,275 | B1 | 6/2005 | Kaplan |
| 6,937,868 | B2 | 8/2005 | Himmel et al. |
| 6,981,023 | B1 | 12/2005 | Hamilton et al. |
| 7,095,828 | B1 | 8/2006 | Elliot et al. |
| 7,142,648 | B1 | 11/2006 | Miller |
| 7,171,186 | B2 | 1/2007 | Miyachi et al. |
| 7,248,857 | B1 | 7/2007 | Richardson et al. |
| 7,277,529 | B1 | 10/2007 | Wuthnow et al. |
| 7,283,809 | B1 | 10/2007 | Weinman |
| 7,369,648 | B1 | 5/2008 | Chang |
| 7,680,491 | B2 | 3/2010 | Zabawskyj et al. |
| 7,738,833 | B2 | 6/2010 | Bettis et al. |
| 7,796,977 | B2 | 9/2010 | Vander Veen |
| 7,826,831 | B2 | 11/2010 | Bettis et al. |
| 7,894,580 | B2 | 2/2011 | Veen et al. |
| 2002/0015403 | A1 | 2/2002 | McConnell et al. |
| 2002/0037075 | A1 | 3/2002 | Flanagan |
| 2002/0049768 | A1 | 4/2002 | Peek et al. |
| 2002/0077098 | A1 | 6/2002 | Tilks et al. |
| 2002/0112007 | A1 | 8/2002 | Wood et al. |
| 2002/0115429 | A1 | 8/2002 | Deluca et al. |
| 2003/0091169 | A1 | 5/2003 | Cain |
| 2003/0099341 | A1 | 5/2003 | Williams |
| 2004/0023643 | A1 | 2/2004 | Vander Veen et al. |
| 2004/0081088 | A1 | 4/2004 | Schinner et al. |
| 2004/0139471 | A1 | 7/2004 | Geen et al. |
| 2004/0146147 | A1* | 7/2004 | Picard et al. ............ 379/88.22 |
| 2004/0248594 | A1 | 12/2004 | Wren |
| 2004/0252679 | A1 | 12/2004 | Williams et al. |
| 2004/0264658 | A1 | 12/2004 | Cline et al. |
| 2005/0089149 | A1 | 4/2005 | Elias |
| 2005/0102368 | A1 | 5/2005 | Forman et al. |
| 2005/0113078 | A1 | 5/2005 | Deitrich |
| 2005/0186944 | A1 | 8/2005 | True et al. |
| 2005/0213715 | A1* | 9/2005 | Winick ..................... 379/39 |
| 2006/0003745 | A1 | 1/2006 | Gogic |
| 2006/0025114 | A1 | 2/2006 | Bales et al. |
| 2006/0025140 | A1 | 2/2006 | Bales et al. |
| 2006/0031470 | A1 | 2/2006 | Chen et al. |
| 2006/0059361 | A1 | 3/2006 | Paden |
| 2006/0062356 | A1 | 3/2006 | Vendrow |
| 2006/0171511 | A1 | 8/2006 | Liu et al. |
| 2006/0173959 | A1* | 8/2006 | McKelvie et al. ............ 709/204 |
| 2006/0239419 | A1* | 10/2006 | Joseph et al. ............... 379/67.1 |
| 2006/0251222 | A1 | 11/2006 | Abramson et al. |
| 2006/0253584 | A1 | 11/2006 | Dixon et al. |
| 2006/0281443 | A1 | 12/2006 | Chen et al. |
| 2007/0038483 | A1 | 2/2007 | Wood |
| 2007/0066284 | A1 | 3/2007 | Gatzke et al. |
| 2007/0127632 | A1 | 6/2007 | Swingle et al. |
| 2007/0127663 | A1 | 6/2007 | Bae |
| 2007/0140443 | A1 | 6/2007 | Woodring |
| 2007/0143106 | A1 | 6/2007 | Dunsmuir |
| 2007/0173233 | A1 | 7/2007 | Vander Veen et al. |
| 2007/0180032 | A1 | 8/2007 | Pearson |
| 2007/0180504 | A1 | 8/2007 | Hung |
| 2007/0207785 | A1 | 9/2007 | Chatterjee et al. |
| 2007/0213050 | A1 | 9/2007 | Jiang |
| 2007/0223666 | A1 | 9/2007 | Teague |
| 2007/0287453 | A1 | 12/2007 | Wang |
| 2008/0008163 | A1 | 1/2008 | Castell et al. |
| 2008/0008299 | A1 | 1/2008 | Didcock et al. |
| 2008/0056459 | A1 | 3/2008 | Vallier et al. |
| 2008/0062246 | A1 | 3/2008 | Woodworth et al. |
| 2008/0062938 | A1 | 3/2008 | Gil-soo et al. |
| 2008/0081609 | A1 | 4/2008 | Burgan et al. |
| 2008/0140767 | A1 | 6/2008 | Rao et al. |
| 2008/0167007 | A1 | 7/2008 | Novick et al. |
| 2008/0167010 | A1 | 7/2008 | Novick et al. |
| 2008/0167014 | A1* | 7/2008 | Novick et al. ............... 455/413 |
| 2008/0188204 | A1 | 8/2008 | Gavner et al. |
| 2008/0200152 | A1 | 8/2008 | Moore |
| 2008/0207176 | A1* | 8/2008 | Brackbill et al. ............ 455/413 |
| 2008/0260118 | A1 | 10/2008 | Lyle |
| 2008/0298459 | A1 | 12/2008 | Yang et al. |
| 2008/0300873 | A1 | 12/2008 | Siminoff |
| 2009/0149220 | A1 | 6/2009 | Camilleri et al. |
| 2009/0253407 | A1 | 10/2009 | Sigmund et al. |
| 2009/0253412 | A1 | 10/2009 | Sigmund et al. |
| 2009/0253413 | A1 | 10/2009 | Sigmund et al. |
| 2010/0159886 | A1 | 6/2010 | Sigmund et al. |
| 2010/0159888 | A1 | 6/2010 | Sigmund et al. |
| 2010/0159889 | A1 | 6/2010 | Sigmund et al. |
| 2010/0159890 | A1 | 6/2010 | Sigmund et al. |
| 2010/0159891 | A1 | 6/2010 | Sigmund et al. |
| 2010/0166161 | A1 | 7/2010 | Dhawan et al. |
| 2010/0167699 | A1 | 7/2010 | Sigmund et al. |
| 2010/0189229 | A1 | 7/2010 | Sigmund et al. |
| 2010/0195807 | A1 | 8/2010 | Sigmund et al. |
| 2010/0222024 | A1 | 9/2010 | Sigmund et al. |
| 2011/0085646 | A1 | 4/2011 | Sigmund et al. |
| 2013/0010937 | A1 | 1/2013 | Sigmund et al. |
| 2013/0012173 | A1 | 1/2013 | Sigmund et al. |
| 2013/0040614 | A1 | 2/2013 | Sigmund et al. |

FOREIGN PATENT DOCUMENTS

| | | |
|---|---|---|
| EP | 1 434 415 | 6/2004 |
| EP | 1 599 022 | 11/2005 |
| KR | 20050001246 | 1/2005 |
| WO | WO 97/45991 | 12/1997 |
| WO | WO 98/03005 | 1/1998 |
| WO | WO 00/73947 | 12/2000 |
| WO | WO 02/065745 | 8/2002 |
| WO | WO 2004/046895 | 6/2004 |
| WO | WO 2007/081929 | 7/2007 |
| WO | WO 2007/095510 | 8/2007 |
| WO | WO 2007/096866 | 8/2007 |
| WO | WO 2008/034555 | 3/2008 |
| WO | WO 2009/029296 | 3/2009 |
| WO | WO 2009/029297 | 3/2009 |
| WO | WO 2009/029298 | 3/2009 |
| WO | WO 2009/029313 | 3/2009 |
| WO | WO 2009/029314 | 3/2009 |
| WO | WO 2009/029323 | 3/2009 |
| WO | WO 2009/029324 | 3/2009 |
| WO | WO 2009/029328 | 3/2009 |
| WO | WO 2009/029330 | 3/2009 |
| WO | WO 2010/002382 | 1/2010 |

OTHER PUBLICATIONS

U.S. Official Action dated Oct. 13, 2011 in U.S. Appl. No. 12/485,335.
U.S. Official Action dated May 22, 2012 in U.S. Appl. No. 12/485,335.
U.S. Official Action dated Apr. 27, 2012 in U.S. Appl. No. 12/160,931.
U.S. Official Action dated Dec. 22, 2010 in U.S. Appl. No. 12/160,940.
U.S. Official Action dated May 31, 2011 in U.S. Appl. No. 12/160,940.
U.S. Official Action dated Apr. 24, 2012 in U.S. Appl. No. 12/160,940.
U.S. Official Action dated Apr. 26, 2012 in U.S. Appl. No. 12/160,946.
U.S. Official Action dated Nov. 4, 2011 in U.S. Appl. No. 12/160,956.
U.S. Official Action dated Jun. 6, 2012 in U.S. Appl. No. 12/160,956.
U.S. Official Action dated Jan. 12, 2011 in U.S. Appl. No. 12/161,021.
U.S. Official Action dated Jun. 1, 2011 in U.S. Appl. No. 12/161,021.
U.S. Official Action dated Dec. 15, 2011 in U.S. Appl. No. 12/161,021.
U.S. Notice of Allowance dated Jun. 21, 2012 in U.S. Appl. No. 12/161,021.

U.S. Official Action dated Nov. 29, 2010 in U.S. Appl. No. 12/161,027.
U.S. Official Action dated May 10, 2011 in U.S. Appl. No. 12/161,027.
U.S. Official Action dated Nov. 23, 2011 in U.S. Appl. No. 12/161,027.
U.S. Official Action dated Dec. 27, 2010 in U.S. Appl. No. 12/161,033.
U.S. Official Action dated May 31, 2011 in U.S. Appl. No. 12/161,033.
U.S. Official Action dated Nov. 29, 2011 in U.S. Appl. No. 12/161,033.
U.S. Official Action dated Jun. 6, 2012 in U.S. Appl. No. 12/161,033.
U.S. Notice of Allowance dated Jul. 24, 2012 in U.S. Appl. No. 12/161,033.
U.S. Official Action dated Dec. 23, 2010 in U.S. Appl. No. 12/161,035.
U.S. Official Action dated Jun. 2, 2011 in U.S. Appl. No. 12/161,035.
U.S. Official Action dated Dec. 2, 2011 in U.S. Appl. No. 12/161,035.
U.S. Official Action dated Jul. 18, 2012 in U.S. Appl. No. 12/161,035.
U.S. Official Action dated Jan. 24, 2011 in U.S. Appl. No. 12/161,064.
U.S. Official Action dated Jul. 8, 2011 in U.S. Appl. No. 12/161,064.
U.S. Official Action dated Jan. 30, 2012 in U.S. Appl. No. 12/161,064.
U.S. Official Action dated Jan. 19, 2011 in U.S. Appl. No. 12/161,076.
U.S. Official Action dated Jul. 1, 2011 in U.S. Appl. No. 12/161,076.
U.S. Official Action dated Jan. 17, 2012 in U.S. Appl. No. 12/161,076.
U.S. Notice of Allowance dated Jul. 17, 2012 in U.S. Appl. No. 12/161,076.
International Search Report & Written Opinion dated Sep. 18, 2008 in PCT Application PCT/US08/67612.
International Search Report & Written Opinion dated Aug. 1, 2008 in PCT Application PCT/US08/61493.
International Search Report & Written Opinion dated Nov. 12, 2008 in PCT Application PCT/US08/65046.
International Search Report & Written Opinion dated Mar. 13, 2009 in PCT Application PCT/US08/68738.
International Search Report & Written Opinion dated Oct. 29, 2008 in PCT Application PCT/US08/67176.
International Search Report & Written Opinion dated Sep. 4, 2008 in PCT Application PCT/US08/54074.
International Search Report & Written Opinion dated Sep. 3, 2008 in PCT Application PCT/US08/61592.
International Search Report & Written Opinion dated Sep. 4, 2008 in PCT Application PCT/US08/67152.
International Search Report & Written Opinion dated Nov. 6, 2008 in PCT Application PCT/US08/67591.
International Search Report & Written Opinion dated Aug. 28, 2008 in PCT Application PCT/US08/61437.
U.S. Office Action dated Oct. 4, 2012 in U.S. Appl. No. 12/485,484.
U.S. Office Action dated Aug. 30, 2012 in U.S. Appl. No. 12/160,931.
U.S. Office Action dated Sep. 14, 2012 in U.S. Appl. No. 12/161,064.
U.S. Office Action dated Oct. 2, 2012 in U.S. Appl. No. 12/485,961.
U.S. Office Action dated Oct. 11, 2012 in U.S. Appl. No. 12/160,946.
U.S. Notice of Allowance dated Oct. 25, 2012 in U.S. Appl. No. 12/160,940.
U.S. Notice of Allowance dated Nov. 23, 2012 in U.S. Appl. No. 12/485,335.
U.S. Notice of Allowance dated Nov. 16, 2012 in U.S. Appl. No. 12/161,027.
U.S. Notice of Allowance dated Dec. 27, 2012 in U.S. Appl. No. 13/616,198.
U.S. Notice of Allowance dated Jan. 31, 2013 in U.S. Appl. No. 12/485,961.
Sigmund et al., U.S. Appl. No. 13/751,505, filed Jan. 28, 2013.

* cited by examiner

FIG. 2 (Initial Provisioning to VMS with COS supporting VM notification via CDS

FIG. 3 (First Boot access)

FIG. 4 (Set Greeting)

FIG. 5 (Set Password)

FIG. 6 (Set Recorded Name)

FIG. 7 (Message Deposit)

FIG. 8 (TUI Access – External Changes)

FIG. 9 (Password Encryption)

SYSTEMS AND METHODS FOR PROVIDING ENHANCED VOICEMAIL SERVICES

RELATED APPLICATIONS

This application is a continuation of copending U.S. application Ser. No. 12/201,945, now U.S. Pat. No. 8,032,122, filed Aug. 29, 2008, which claims priority to U.S. Application No. 60/969,419, filed Aug. 31, 2007, all of which are hereby incorporated by reference.

TECHNICAL FIELD

The present disclosure relates generally to voicemail service and, more particularly, to providing enhanced voicemail services.

BACKGROUND

Voicemail systems allow a caller to leave a voice message if the desired recipient is unavailable. Traditional voicemail systems (referred to herein as plain old voicemail or POVM) allow a subscriber to place a call to a voicemail system to access messages stored in his or her voicemail box. This is done through a telephone user interface (TUI) that facilitates interaction between the subscriber and the voicemail system. The TUI provides functions for the subscriber to listen to messages, skip messages, delete messages, and save messages. The TUI also provides functions for the subscriber to set a voicemail greeting, record a voicemail greeting, record a name, and set/change a password.

A subscriber with multiple voicemail messages is required to listen to, skip, delete, or save each message while reviewing the voicemail box. This is time consuming and can be frustrating for the subscriber in situations where an important message has been deposited, requiring the subscriber to listen to, skip, delete or save each message in search of the important message.

To help reduce the need to search through multiple messages, various improved voicemail systems have been developed that allow messages to be stored based on a priority scheme to increase the efficiency of listening to voicemail messages. Often, these systems use an identifier, such as a telephone number of the caller, to identify a priority and position the voicemail messages in order based on the assigned priorities. When the recipient accesses the voicemail system to acquire voicemail messages, the recipient is presented with each voicemail message in order of the priority or importance to the recipient. This reduces unwanted listening or skipping through multiple voicemail messages to find an important message. However, an important message can easily be relegated to a position of low importance if the subscriber has not previously set the priority for the caller. In this system, the priority for an incoming voicemail message is determined directly by the telephone number associated with the caller.

The aforementioned systems fail to allow a subscriber to select the exact voicemail message the subscriber would like to hear. Further, the aforementioned systems require the use of a TUI to access the voicemail system. Still further, these systems merely notify a subscriber of a pending voicemail message with a message waiting indicator (MWI) and require that the subscriber access the voicemail system to retrieve the pending message(s).

SUMMARY

In one aspect of the present disclosure, a method for operating a mobile device to set a voicemail greeting directly from the mobile device includes providing the mobile device with a memory for storing a visual voicemail (VVM) application, an I/O interface, and a microphone for receiving an audio input. The method further includes receiving a selection for an option to record the voicemail greeting, receiving the audio input, recording the audio input as the voicemail greeting for a voicemail account associated with the mobile device, and storing the recorded voicemail greeting in the memory. The method further includes the VVM application generating a request in response to the voicemail greeting being stored in the memory, wherein the request includes the recorded voicemail greeting, a network address for a VVM system, and instructions to set the voicemail greeting as an active voicemail greeting for the voicemail account. The method further includes transmitting the request to the VVM system using the network address and, in response to the request, the mobile device receiving a response that includes an indication of whether the voicemail greeting was set as the active voicemail greeting.

In some embodiments, the method includes the VVM application generating a "ChangeGreeting" HTTP request that includes the recorded voicemail greeting in a MIME message body, the network address for the VVM system, and instructions to set the voicemail greeting as the active voicemail greeting for the voicemail account.

In some embodiments, the method further includes the mobile device receiving a hostname and port number for the VVM system in a prior communication with the VVM system. In other embodiments, the method further includes the mobile device receiving a security token for facilitating secure communications between the mobile device and the VVM system in a prior communication with the VVM system.

In some embodiments, the method includes recording the audio input as a default voicemail greeting for the voicemail account associated with the mobile device. In other embodiments, the method includes recording the audio input as a contact-specific voicemail greeting for the voicemail account associated with the mobile device.

In some embodiments, the method further includes the mobile device receiving an alternate selection to change the active voicemail greeting to a pre-recorded voicemail greeting.

In another aspect of the present disclosure, a computer-readable medium including computer-executable instructions that, when executed by a processor, perform the steps of a method for operating a mobile device to set a voicemail greeting directly from the mobile device is disclosed. The method performed includes the steps set forth in the above method.

In another aspect of the present disclosure, a mobile device includes a processor and a transceiver, in communication with the processor, wherein the transceiver provides a communication interface between the mobile device and a visual voicemail (VVM) system remote to the mobile device. The mobile device further includes a microphone, in communication with the processor, the microphone allowing audio signals to be received by the mobile device as an audio input. The mobile device further includes an I/O interface, in communication with the processor, the I/O interface providing a man-machine interface between a user of the mobile device and a VVM application. The mobile device further includes a memory, in communication with the processor, the memory including the VVM application for allowing user interaction via the I/O interface to set a voicemail greeting directly from the mobile device. The VVM application: receives a selection for an option to record the voicemail greeting; in response to the option being selected, receives the audio input; records the audio input as the voicemail greeting for a voicemail account associated with the mobile device; stores the recorded voicemail greeting in the memory; generates a request in response to the voicemail greeting being stored in the memory, wherein the request includes the recorded voicemail greeting, a network address for a VVM system, and instructions to set the voicemail greeting as an active voicemail greeting for the voicemail account; transmits the request to the VVM system using the network address; and receives a response to the transmitted request from the VVM system, the response including an indication of whether the voicemail greeting was set as the active voicemail greeting.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
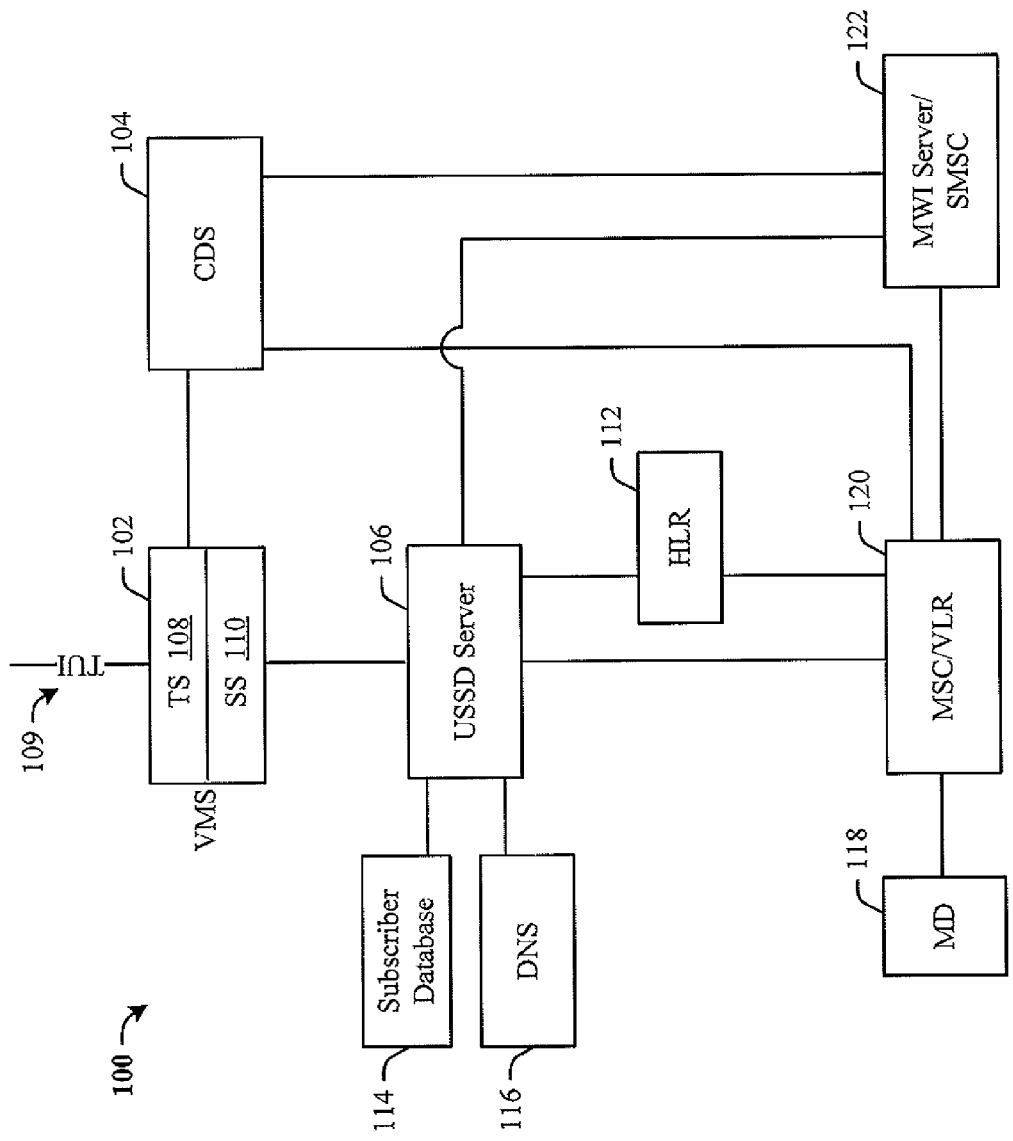
FIG. 1 illustrates an exemplary network in which the present disclosure can be implemented.

Referring now to the drawings, wherein like numerals represent like elements throughout the several views, FIG. 1 illustrates a non-limiting example of a network 100 in which the present disclosure can be implemented. It should be understood that some elements have not been illustrated so as not to obscure the present disclosure.

Although the present disclosure is applicable to any existing or yet to be developed wireless telecommunications network, aspects of the disclosed architecture are described with reference to the Global System for Mobile communications (GSM) air interface that uses general packet radio service (GPRS) as an enabling bearer. As indicated above, examples of other suitable wireless and radio frequency data transmission systems include networks utilizing time division multiple access (TDMA), frequency division multiple access (FDMA), wideband code division multiple access (WCDMA), orthogonal frequency division multiplexing (OFDM), and various other 2.5G, 3G (third generation), and above wireless communications systems. Examples of other suitable enabling bearers include universal mobile telecommunications system (UMTS), enhanced data rates for global evolution (EDGE), high speed downlink packet access (HSDPA), and similar communications protocols.

The illustrated network 100 includes a voicemail system (VMS) 102 that is in communication with a content delivery server (CDS) 104 and an unstructured supplementary service data (USSD) server 106. The VMS 102 can include a telephony server (TS) 108 for handling incoming voicemail inquiries via a telephone user interface (TUI) 109 and a storage server (SS) 110 for storing and managing voicemail messages for voicemail accounts. The USSD server 106 can be configured to receive, decode, and process new USSD messages. The USSD server 106 can be configured to query a database to retrieve a VMS hostname for the VMS (e.g., VMS 102) that is serving a mobile device (MD) 118. The USSD server 106 can be configured to query a database to resolve the VMS hostname to a corresponding IP address. The USSD server 106 can be configured to obtain a subscriber's voicemail class of service (COS) and send the voicemail COS to the subscriber's MD 118. To enable the execution of the aforementioned functions, the USSD server 106 is illustrated as being in communication with a home location register (HLR) 112, a subscriber database 114, and a domain name server (DNS) 116. The USSD server 106 can also be in communication with a mobile switching center/visiting location register (MSC/VLR) 120 and a message waiting indicator (MWI)/short message service center (SMSC) 122. The illustrated communication links are merely exemplary and are not intended to limit communications between the various network 100 elements via the links shown.

The subscriber database 114 can be configured to store and manage subscriber data, such as, for example, account information, billing information, services information, and equipment information for subscribers.

The DNS server 116 can maintain a database for resolving VMS hostnames and IP addresses for various network 100 elements, such as, the VMS 102, for example. The USSD server 106 can retrieve a VMS hostname from the subscriber database 114 and query the DNS 116 to resolve the IP address for the VMS hostname.

The HLR 112 can be configured to provide routing information for mobile-terminated calls and short message service (SMS) messages. The HLR 112 is illustrated as being in communication with the MSC/VLR 120. The MSC/VLR 120 is illustrated as being in communication with the MD 118 and the MWI/SMSC 120 that can be configured for SMS and message waiting indicator (MWI) delivery. Multimedia message service (MMS) center functionality is also contemplated for the MWI/SMSC 120 or can be provided by another network 100 element. The MD 118 can be, but is not limited to, a wireless communications device, a cellular telephone, a WIFI telephone, a WIMAX telephone, a dual-mode telephone, and the like configured to operate on any wireless telecommunications network described herein above. An exemplary MD 118 and components thereof is described with reference to FIG. 10.

The VMS 102 can be configured to store one or more voicemail accounts that can be associated with one or more voicemail boxes. A voicemail account can be assigned to a subscriber and can be associated with the MD 118. A voicemail box can be a VMS-hosted voicemail box stored in a memory of a VMS. In addition or in the alternative, a voicemail box can be a MD-hosted voicemail box. A MD-hosted voicemail box can be stored in a memory of the MD 118. The terms "voicemail account" and "voicemail box" as used herein may, at times, be used interchangeably to describe a mobile subscriber's voicemail access. Accordingly, the MD 118 can include functionality to retrieve and store, in memory, a voicemail message. The MD 118 can receive and store a portion of a newly deposited voicemail message, for example, a voicemail header and can retrieve the voicemail message body at a later time.

The voicemail service provider or any third party provider can define the number of voicemail messages that can be stored in a voicemail box. The maximum voicemail message length can also be set. The number of voicemail messages and the maximum voicemail message length can be configured on the VMS 102.

Prior to a subscriber being provisioned for visual voicemail service, the voicemail box is in a not provisioned state. Upon being provisioned for visual voicemail service, the voicemail box state is changed to provisioned—not initialized to reflect that the subscriber is provisioned for service but has not yet initialized service via a first boot access process described herein below with reference to FIG. 3. Upon completion of the first boot access process, the voicemail box state changed to provisioned—initialized to reflect that the subscriber is provisioned for voicemail service and has completed the first boot access process.

The VMS 102 can be accessed via traditional or plain old voicemail (POVM) methods and visual voicemail (VVM) methods described herein. State changes to voicemail messages, whether requested through the TUI 109 via POVM methods or directly on the MD 118, can be automatically updated in the VMS-hosted voicemail box and the MD-hosted voicemail box. Updates ensure automatic and full synchronization between the MD 118 and the VMS 102 so that tip-to-date voicemail information is stored on the MD 118.

A VMS-hosted voicemail box can recognize and maintain message states for each voicemail message. A message state can be, but is not limited to, an unheard—new state, a skipped state, and a saved—read state, for example. Messages can be deleted from the VMS 102 via the TUI 109 or directly on the MD 118. In either case, the message can be deleted on both the VMS 102 and the MD 118. In an alternative embodiment, deleted messages remain accessible on the MD 118 and/or the VMS 102 for a specified period of time to allow the message to be recovered in the case of accidental or premature deletion. In other embodiments, the VMS 102 discards all messages after the MD 118 has successfully received and stored the available message content.

A MD-hosted voicemail box can recognize and maintain message states. A message state can be, but is not limited to, an unheard—new state, a saved—read state, and a deleted state. The MD 118 does not require a skipped state because VVM provides an interface that allows a subscriber to access any message regardless of the order in which the message was received and is not subject to restraint of saved orders or priority schemes. As mentioned above, the MD-hosted voicemail box deleted state can be configured such that the message is available for recovery or merely as an indication that the message has been deleted. Either of these options can be set to be available for a time specified by either the subscriber via a device input or by the voicemail service provider. A recover option can be provided on the MD 108 so that a deleted message can be recovered for a designated period of time.

It should be understood that the illustrated elements are merely exemplary of one network configuration that can be used to implement the various aspects of the present disclosure. In alternative embodiments, some elements can be combined. For example) the CDS 104 can be combined with the VMS 102 and the combined VMS/CDS can provide the functionality of both elements. Other exemplary combinations are contemplated.

Figure 2:
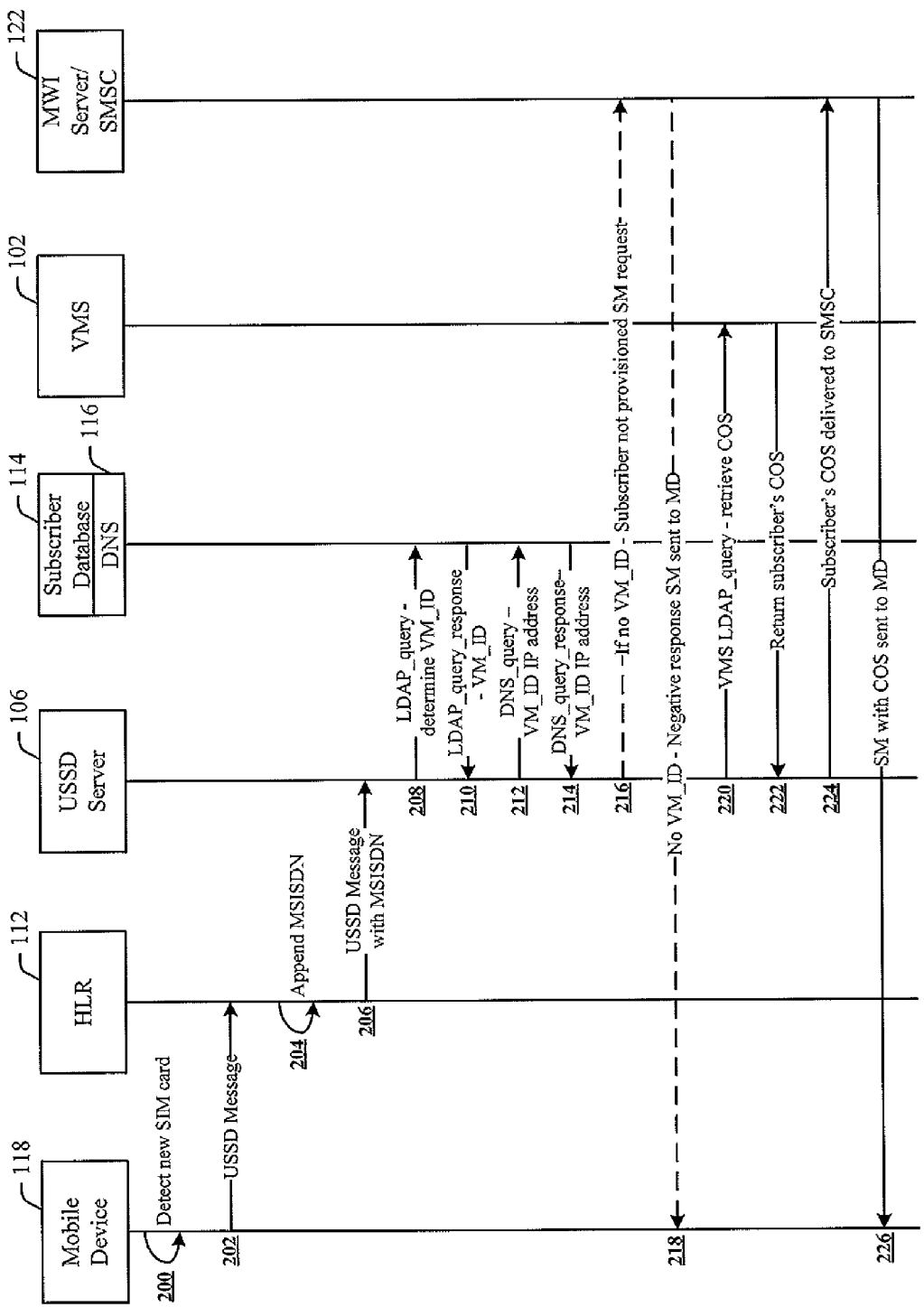
FIG. 2 is an exemplary message flow diagram illustrating a process for provisioning a subscriber for visual voicemail service, according to the present disclosure.

Referring now to FIG. 2, a process for provisioning a mobile device for visual voicemail (VVM) is illustrated, according to the present disclosure. In FIGS. 2-9, messages are sent using a variety of protocols, such as, for example, short message peer-to-peer (SMPP), DNS protocol, lightweight directory access protocol (LDAP), unstructured supplementary service data (USSD) protocol, Internet message access protocol version 4 (IMAP4), hypertext transfer protocol (HTTP), and HTTP over secure socket layer (HTTPS). The description provided below assumes an understanding of these protocols and as such further explanation is not provided. The use of alternative protocols or additional protocols to acquire similar results is deemed to be within the scope of the present disclosure. Accordingly, logical variations of the illustrated message flow are contemplated.

In FIGS. 2-9, the VMS 102 and the CDS 104 are illustrated as separate elements, although this is not necessarily the case. The VMS 102 and the CDS 104 can be combined such that the functionality of each element is combined. Accordingly, in the illustrated embodiments, messages received by the VMS 102 or CDS 104 would be received by the combined VMS/CDS, and messages sent from the VMS 102 or CDS 104 would be sent from the combined VMS/CDS. Other network elements can be combined in a similar manner.

The message flow begins at the MD 118 upon detection of a new integrated circuit card ID (ICCID) of a subscriber identity module (SIM) or universal SIM (USIM), at step 200. If no SIM is present, the process fails and the MD 118 will not perform the remaining functions of this process. For example, if no SIM is inserted, the MD 118 may be configured to only allow emergency calls and prevent all other calls or communication. If a SIM is present, at step 202, the MD 118 can generate a USSD message and send the message to the HLR 112. The HLR 112 can receive the USSD message and append a mobile subscriber ISDN number (MSISDN) to the USSD message, at step 204. At step 206, the HLR 112 can send the USSD message with the MSISDN to the USSD server 106. The USSD server 106 can receive the message and submit an LDAP_query to the subscriber database 114 to determine the hostname of the VMS 102 (VM_ID) serving the subscriber, at step 208. The subscriber database 114 can respond with the proper VM_ID, at step 210. At step 212, the USSD server 106 can send a DNS_query to the DNS server 116 to obtain an IP address that corresponds to the VM_ID. The DNS server 116 can resolve the IP address from the VM_ID and submit a DNS_query_response to the USSD server 106 that includes the IP address for the VMS 102, at step 214. In an alternative embodiment, the IP address for the VMS 102 can be obtained by a data table provisioned on another network element, such as the CDS 104, for example.

If no VM_ID is found, the subscriber is not provisioned for voicemail service. The USSD server 106 can generate a message indicating that the subscriber is not provisioned for voicemail service, and send the message to the SMSC 122, at step 216. The SMSC 122 can receive the message, generate a short message, and send the message to the MD 118, at step 218, to notify the subscriber that voicemail service is not provisioned. If a VM_ID is found, the USSD server 106 can send a query to the VMS 102 to retrieve the voicemail class of service (COS) for the subscriber, at step 220. At step 222, the VMS 102 can respond with the subscriber's COS. At step 224, the USSD server 106 can send the subscriber's COS to the SMSC 122. The SMSC 122 can receive the message, generate a short message that includes the subscriber's voicemail COS, and send the SM to the MD 118, at step 226. In some embodiments, the requesting subscriber will have a COS below the threshold needed for VVM service. In these embodiments, the subscriber may be denied VVM service and the present process may fail. The subscriber may upgrade their service and the present process can repeat.

A COS can be assigned to each subscriber for the subscribed voicemail service. In networks that offer POVM and VVM, voicemail service subscriptions that include only POVM service can have a COS that provides only POVM service. Likewise, voicemail service subscription that include VVM service can have a COS that enables delivery of or access to VVM service as a stand-alone service or in addition to POVM.

Upon completion of the provisioning process described above, the subscriber and the associated MD 118 are capable of being initialized via a first boot process that is described in detail immediately below with reference to FIG. 3. A VMS 102 voicemail box can be changed from a not provisioned state to a provisioned—not initialized state after the provisioning process is complete.

Figure 3:
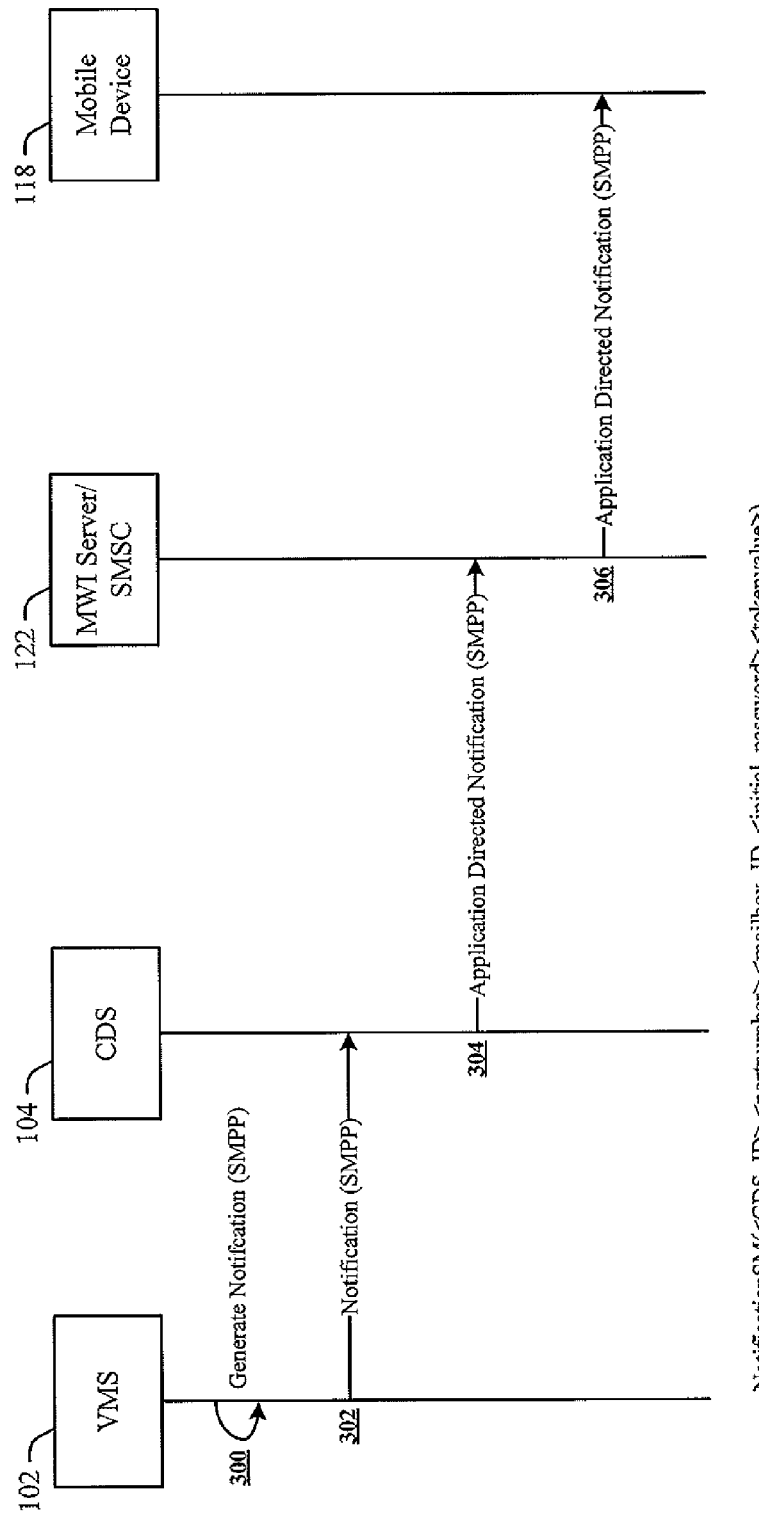
FIG. 3 is an exemplary message flow diagram illustrating a process for first boot access of a mobile device to a visual voicemail system, according to the present disclosure.

Referring now to FIG. 3, an exemplary process for first boot access of a MD to a VVM system is illustrated, according to the present disclosure. The first boot access process assumes that the subscriber has been provisioned and has the proper voicemail COS for VVM as determined in the process described immediately above in FIG. 2. When a subscriber is initially provisioned to the VMS 102 with the appropriate voicemail COS, the subscriber's account is enabled for voicemail notification via the CDS, for example. The VMS 102 can initiate a notification message to the CDS 104 intended for delivery to the MD 118 via an SMS message. The notification message confirms that VVM service is enabled and accessible via a VVM application stored on the MD 118. A visual prompt can be presented to the subscriber as a cue or reminder to setup a voicemail box prior to receipt of incoming voice messages. Conversely, POVM blocks receipt of new messages until the mailbox is set up, or notifies the subscriber of the first new voice message thereby prompting the subscriber to place a call to retrieve the new voicemail message and bars access to the message until the subscriber sets up the POVM voicemail box. The visual prompt of the present disclosure advantageously eliminates the annoyance and need to access the voicemail system via the TUI 109 to setup the voicemail box and ensures the subscriber sets up a voicemail box.

The VVM service can use several parameters to enable automatic synchronization between the MD 118 and the VMS 102. Prior to first boot, the MD 118 does not have this information. Accordingly, the first boot process described below provides an initial SMS message that includes a set of parameters for future synchronization sessions.

The message flow begins when the VMS 102 generates an SMPP notification message (notification_SM), at step 300. For example, a notification_SM message can include, but is not limited to, the hostname and port number for the subscriber's CDS 104, a token identifying the subscriber's VMS 102, the subscriber's voicemail box ID (mailbox_ID) embedded with the token to uniquely identify the subscriber for the VMS 102, and the current VMS password (if the password has not already been set). In an alternative embodiment, the notification_SM can include the IP address and port number for the subscriber's CDS 104 and the mailbox_ID. The password and token are added to increase security and preserve data integrity. If a password is used, the password may not be encrypted and instead the password can be obscured to hide the actual default password digits. Security aspects of the present disclosure are described in greater detail with reference to FIG. 9.

After the notification_SM is generated, the VMS 102 can send the notification_SM to the CDS 104, at step 302. The CDS 104 can receive the notification_SM and generate an application directed notification and send the notification to the SMSC 122, at step 304. The SMSC 122 can receive and forward the message to the MD 118, at step 306. The application directed SM can be received by the MD 118 and sent to the VVM application stored on the MD 118. A user may not be notified of the incoming SM. The VVM application can generate any prompts that are necessary to guide the user through setup and other processes identified in the application directed SM upon receipt of the SM or at a time thereafter.

If the SIM card is removed from the MD 118 and replaced with a new SIM card, the MD 118 can be initially unaware as to whether the new subscriber is subscribed to VVM service. It is assumed that the new subscriber is subscribed to POVM service and can access voicemail via the TUI 109, however, all VVM functionality is unavailable until the proper provisioning and initialization steps are taken for the new subscriber and SIM. In the meantime, the previous subscriber's VVM data, including all VVM messages, can be automatically removed or hidden to preserve subscriber privacy. As an exception to the synchronization protocol described above, if messages are removed due to removal of the SIM, those messages are not necessarily removed from the VMS 102, but can be retained for retrieval when the SIM is reinserted or used with another MD. Upon insertion of the new SIM, the processes described above in FIGS. 2-3 can substantially repeat for the new subscriber. If the new subscriber is provisioned for VVM service and has performed a first boot process previously on the MD 118 or another VVM compatible device, the new subscriber's VVM can be acquired and the subscriber can have normal access to VVM service. If the old subscriber chooses to reinsert the SIM, a notification_SM can be sent from the VMS 102 to the MD 118 and VVM service for the old subscriber can resume. The old subscriber's voicemail message can be retrieved again or un-hidden to recreate a VVM box as it was before the SIMs were swapped.

For situations in which VVM is temporarily unavailable for network maintenance, device maintenance, or other unforeseen circumstances, the VVM subscriber can access voicemail via the TUI 109 as a default access method.

Figure 4:
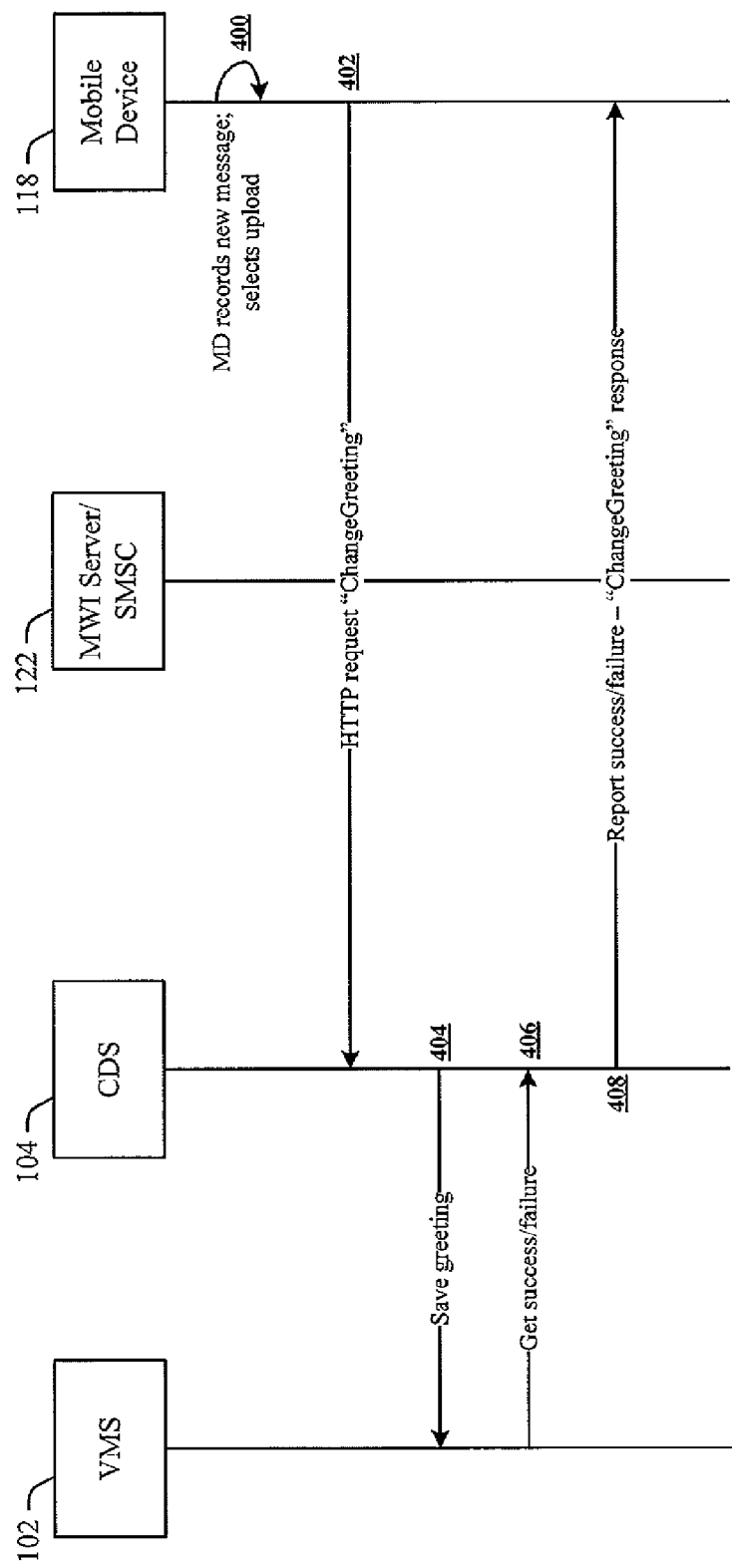
FIG. 4 is an exemplary message flow diagram illustrating a process for setting or changing a voicemail greeting, according to the present disclosure.

Referring now to FIG. 4, an exemplary process for setting or changing a voicemail greeting is illustrated, according to the present disclosure. For this process, it is assumed that the VVM application has received the hostname and port number of the serving CDS 104 and the token identifying the VMS 102 in a prior exchange with the CDS 104 and has stored this data for use in setting up a data channel to the CDS 104. The present process is described for a personal greeting for all calls, however, it should be understood that contact-specific greetings may also be set or changed using similar processes for VMSs that support such greetings. Other greeting types, for example, an extended absence greeting are also contemplated.

The set/change greeting process can begin when the subscriber records a new voicemail greeting on the MD 118, at step 400. The subscriber can then select an upload function on the VVM application to upload the new greeting. The greeting can be formatted using any audio codec, such as, but not limited to, adaptive multi-rate (AMR), AMR wideband (AMR-WB), and any other standardized or independent audio codecs.

After a new greeting has been recorded, the VVM application can generate a "ChangeGreeting" HTTP request that includes the recorded greeting in the selected format in a MIME message body. The "ChangeGreeting" request can be sent to the CDS 104 for storage, at step 402. The CDS 104 can receive the "ChangeGreeting" request and send a message, at step 404, to notify the VMS 102 to save the recording as the primary greeting for the user. If a custom voicemail greeting is not set, the default voicemail greeting (e.g., the network default greeting) can be replaced with the new voicemail greeting. The success or failure of the save can be reported back to the CDS 104, at step 406. The CDS 104 can report the success or failure of the "ChangeGreeting" request in a "ChangeGreeting" response, at step 408. If the "ChangeGreeting" request fails, the VVM application can notify the user to retry, offer customer support, and/or refer the customer to a telephone number or website address for further information and troubleshooting.

Figure 5:
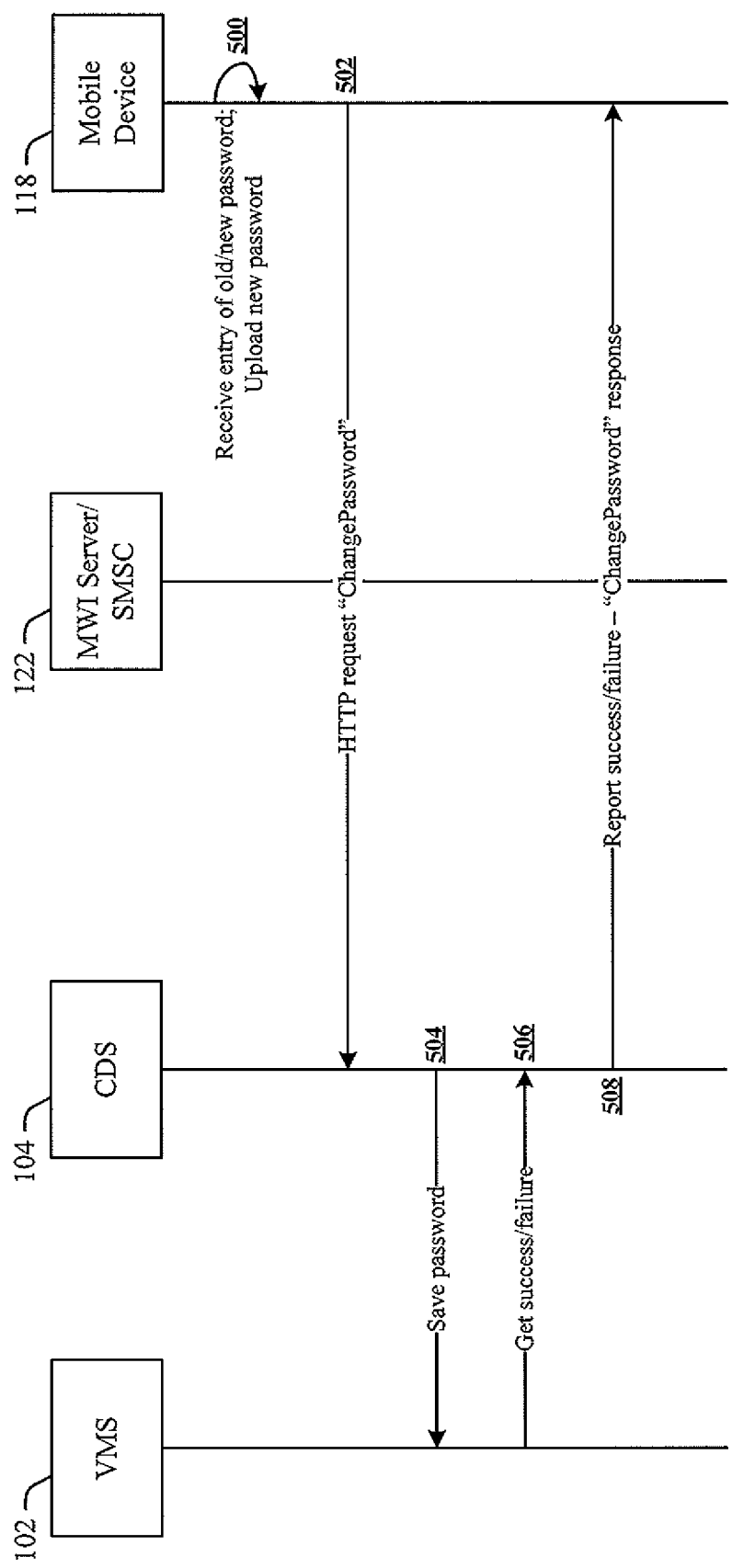
FIG. 5 is an exemplary message flow diagram illustrating a process for setting or changing a voicemail password, according to the present disclosure.

Referring now to FIG. 5, an exemplary process for setting or changing a voicemail password is illustrated, according to the present disclosure. For this process, it is assumed that the VVM application has received the hostname and port number of the serving CDS 104 and the token identifying the VMS 102 in a prior exchange with the CDS 104 and has stored this data for use in setting up a data channel to the CDS 104. If a password has not been set, a default password provided in the notification_SM message can be required to be initialized prior to the subscriber accessing the voicemail box, setting the greeting, or setting a recorded name. If the password has not been initialized, the CDS 104 can send the current password in a notification_SM message. The current password can then be used to access the voicemail box to configure the new password. The password can be any combination of numbers and/or characters and can be any length. In an exemplary embodiment, the password can be set with a minimum and maximum length. The VVM application can be configured to verify that the password length complies with this requirement prior to attempting to change the password on the VMS. If the subscriber enters a password that fails to comply with the length requirement, the VVM application can notify the user to retry with a password that satisfies the minimum and maximum length requirement, offer customer support, and/or refer the customer to a telephone number or website address for further information and troubleshooting.

The set/change password process can begin when a subscriber is prompted to enter both the old password and the new password. The subscriber can enter the old password and new password on the MD 118, at step 500. After the passwords have been entered, the VVM application can generate a "ChangePassword" HTTP request with no MIME message body. The "ChangePassword" request can be sent to the CDS 104 for storage, at step 502. The CDS 104 can receive the "ChangePassword" request and send a message, at step 504, to notify the VMS 102 to perform a password validation and to save the new password. The success or failure of the save can be reported back to the CDS 104, at step 506. The CDS 104 can report the success or failure of the "ChangePassword" request in a "ChangePassword" response, at step 508. Error codes can be set for the VMS 102 and/or the CDS 104 to return to the MD 118 in case the password is found invalid for any reason or if the password has expired. The VVM application can be configured to receive an error code and provide corrective action to the subscriber to resolve the password issue. For example, the VVM application can notify the user to retry, offer customer support, and/or refer the customer to a telephone number or website address for further information and troubleshooting.

After the first boot access process, the password can be encrypted to avoid unauthorized parties from identifying the password and potentially gaining access to the subscriber's private voicemail data. An exemplary password encryption process is described in detail with reference to FIG. 9.

Figure 6:
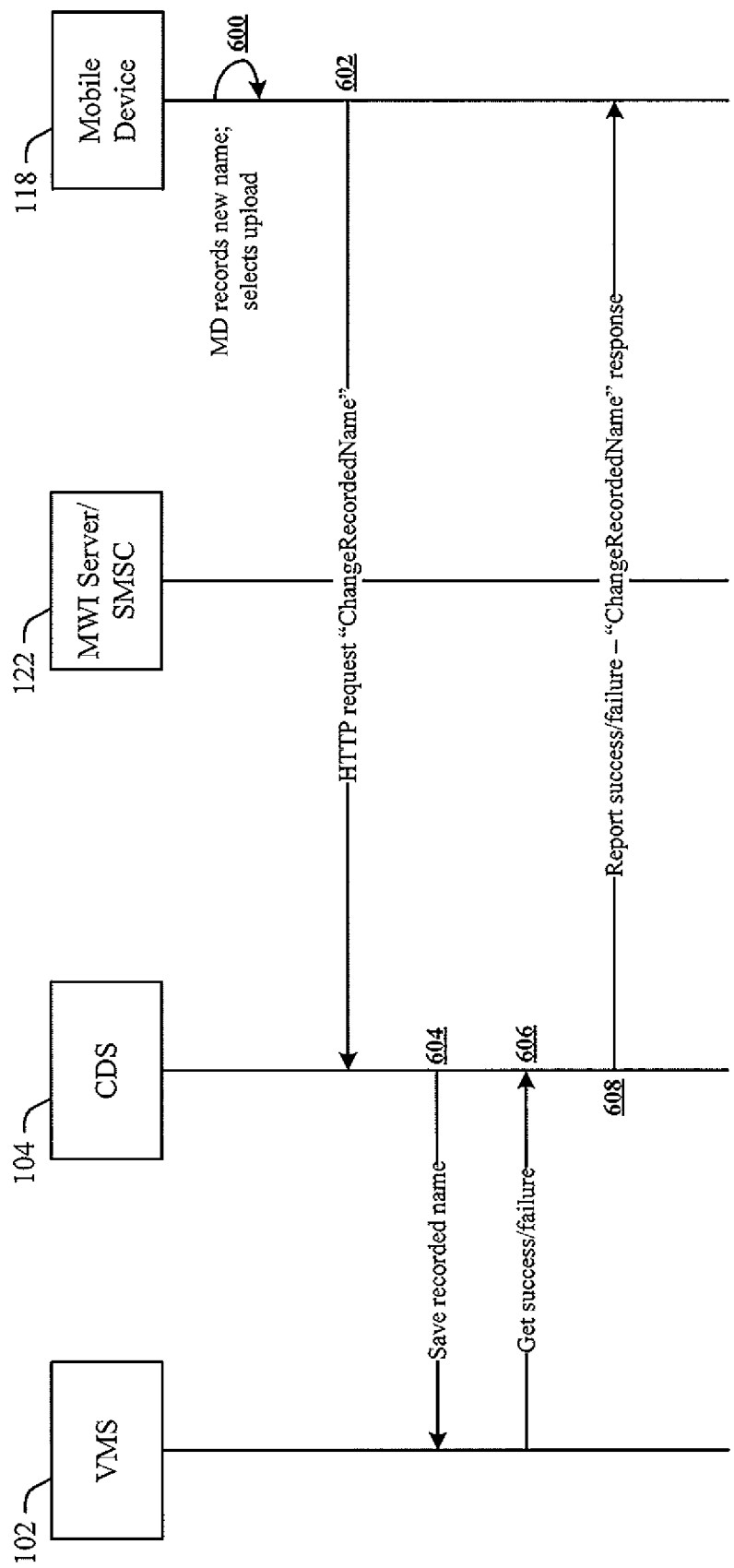
FIG. 6 is an exemplary message flow diagram illustrating a process for setting or changing a voicemail recorded name, according to the present disclosure.

Referring now to FIG. 6, an exemplary process for setting or changing a voicemail recorded name is illustrated, according to the present disclosure. For this process, it is assumed that the VVM application has received the hostname and prior number of the serving CDS 104 and the token identifying the VMS 102 in a prior exchange with the CDS 104 and has stored this data for use in setting up a data channel to the CDS 104. This process can occur during mailbox initialization as directed from the VVM application or at anytime the subscriber desires to change the recorded name.

The set/change recorded name process can begin when the subscriber records a new name on the MD 118, at step 600. The subscriber can select an upload function on the VVM application to upload the new name. The recorded name can be formatted using any audio codec, such as, but not limited to, adaptive multi-rate (AMR), AMR wideband (AMR-WB), or any other standardized or independent audio codec.

After a new name has been recorded, the VVM application can generate a "ChangeRecordedName" HTTP request that includes the recorded name in the selected format in a MIME message body. The "ChangeRecordedName" request can be sent to the CDS 104 for storage, at step 602. The CDS 104 can receive the "ChangeRecordedName" request and send a message, at step 604, to notify the VMS 102 to save the recording as the recorded name for the subscriber. The success or failure of the save can be reported back to the CDS 104, at step 606. The CDS 104 can report the success or failure of the "ChangeGreeting" request in a "ChangeGreeting" response, at step 608.

The VVM application can be configured to switch between the standard greeting without name, the standard greeting with name, and a custom greeting, for example. The standard greeting can be, for example, a greeting provided by the VM service provider as a default with or without the recorded name. The VVM application can be further configured to retrieve the current voicemail greeting and recorded name using a HTTP request.

Figure 7:
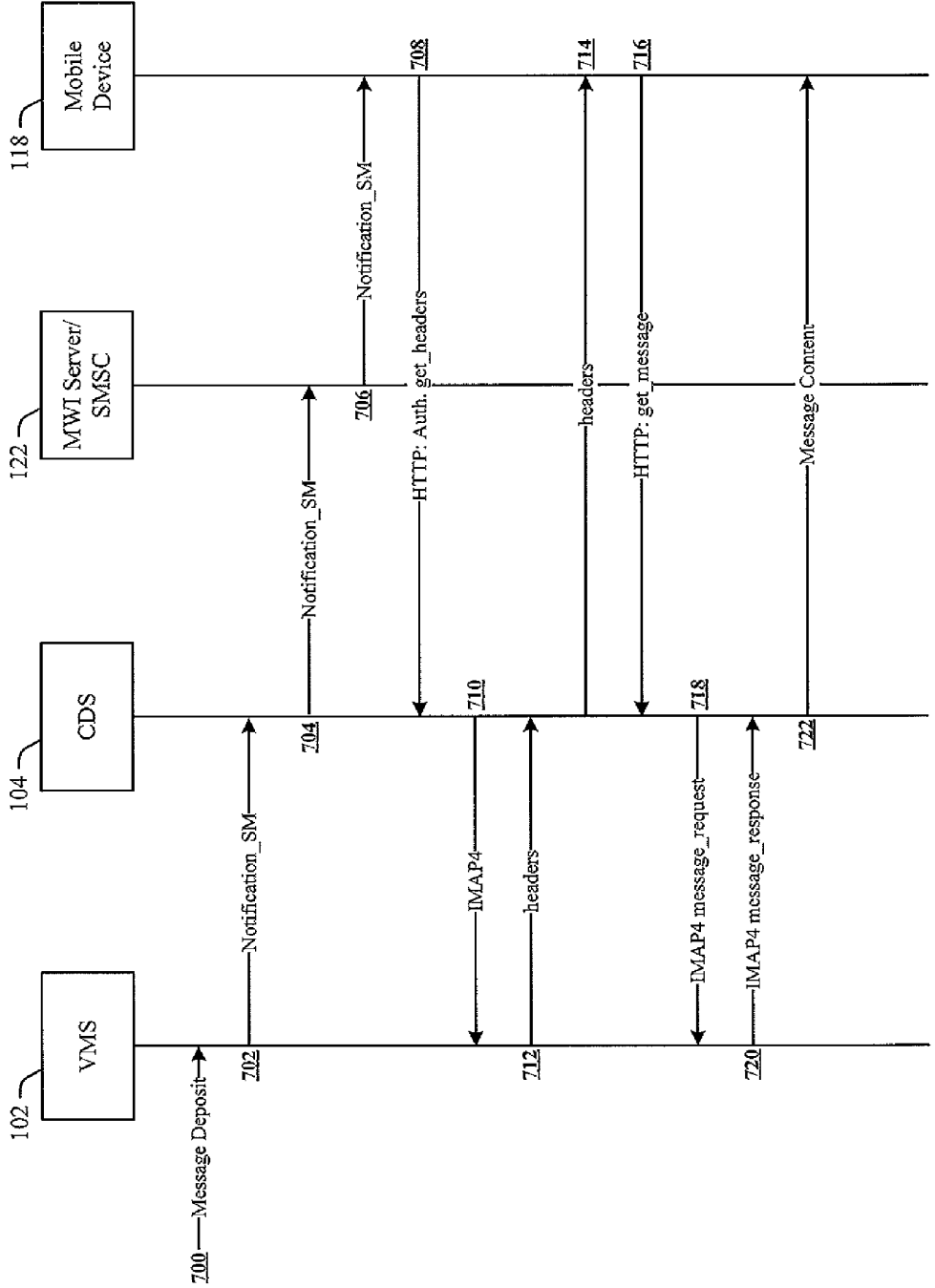
FIG. 7 is an exemplary message flow diagram illustrating a process for voicemail message deposit and subsequent retrieval of message content for local storage on a mobile device, according to the present disclosure.

Referring now to FIG. 7, an exemplary process for voicemail message deposit and subsequent retrieval of message content for local storage on the MD 118 is illustrated, according to the present disclosure. The process can begin when a message is deposited into the VMS 102, at step 700. The VMS can generate a notification_SM at a time after a message is deposited and can send the notification_SM to the CDS 104, at step 702. The CDS 104 can forward the message, at step 704, to the SMSC 122 that, in turn, can forward the message, at step 706, to the MD 118. The MD 118 can receive the notification_SM message and can generate an HTTP message get_headers that can be sent to the CDS 104, at step 708. The get_headers message can include parameters such as the date, time, and calling line identity (CLI). The get_headers message can additionally include authentication information for IMAP sessions between the CDS and VMS. At step 710, the CDS 104 can initiate an IMAP session with the VMS 102. Accordingly, a TCP connection can be established and the get_headers message can be used to authenticate the session, after which the subscriber's voicemail box can be accessed on the VMS 102 to retrieve the header information for the voicemail messages. The VMS 102 can send the headers to the CDS 104, at step 712. The CDS 104 can forward the headers to the MD 118, at step 714. The MD 118 can use the headers to determine the status of each message stored on the MD 118 and identify any newly deposited messages. After the MD 118 determines which message(s) needs to be retrieved, the MD 118 can generate and send an HTTP message get_message with the header information for the requested message(s), at step 716. At step 718, the message can be received and the CDS 104 can generate and send an IMAP message_request to the VMS 102. The IMAP message_request can include the requested voicemail message header information. The VMS 102 can process the request and return the requested message content in an IMAP message_response, at step 720. The CDS 104 can deliver the message content, at step 722. Upon receipt of the message content, the MD 118 can store the content under the appropriate header in a memory and permit the subscriber to access the content via a VVM application graphical user interface (GUI). The message content can be formatted using any audio codec, such as, but not limited to, adaptive multi-rate (AMR), AMR wideband (AMR-WB), or any other standardized or independent audio codec.

In some embodiments, an "if-modified-since" HTTP message can be used to occasionally poll the VMS 102 for the inbox voicemail message list and update any voicemail message "if-modified-since" the last update, for example, if a message was deleted or added. This can reduce the amount of data traversing the network thereby reducing network congestion. In some instances, however, the header information is relatively small and as such no noticeable improvement may be achieved for sending only the modified voicemail message header.

In some embodiments, more than one connection can be established to the VMS 102 or in some cases to multiple or redundant VMS's. This allows for simultaneous requests in order to serve a subscriber's request to view or listen to a message faster. Load balancing techniques can also be implemented.

In some embodiments, message downloads that are interrupted, for example, via cancellation or connection failure, can be resumed starting at the last received byte. These embodiments assume the message is stored in full, at least temporarily, on the CDS 104. In some instances, however, the CDS 104 can delete the message after the message content is sent to the MD 118. A subsequent request for one or more previously sent messages can be facilitated by re-retrieving the message, re-transcoding the message, and sending the message to the MD 118.

In some embodiments, requests to the CDS 104 can be pipelined in accordance with HTTP standard specifications, thereby reducing network latency for multiple requests.

Figure 8:
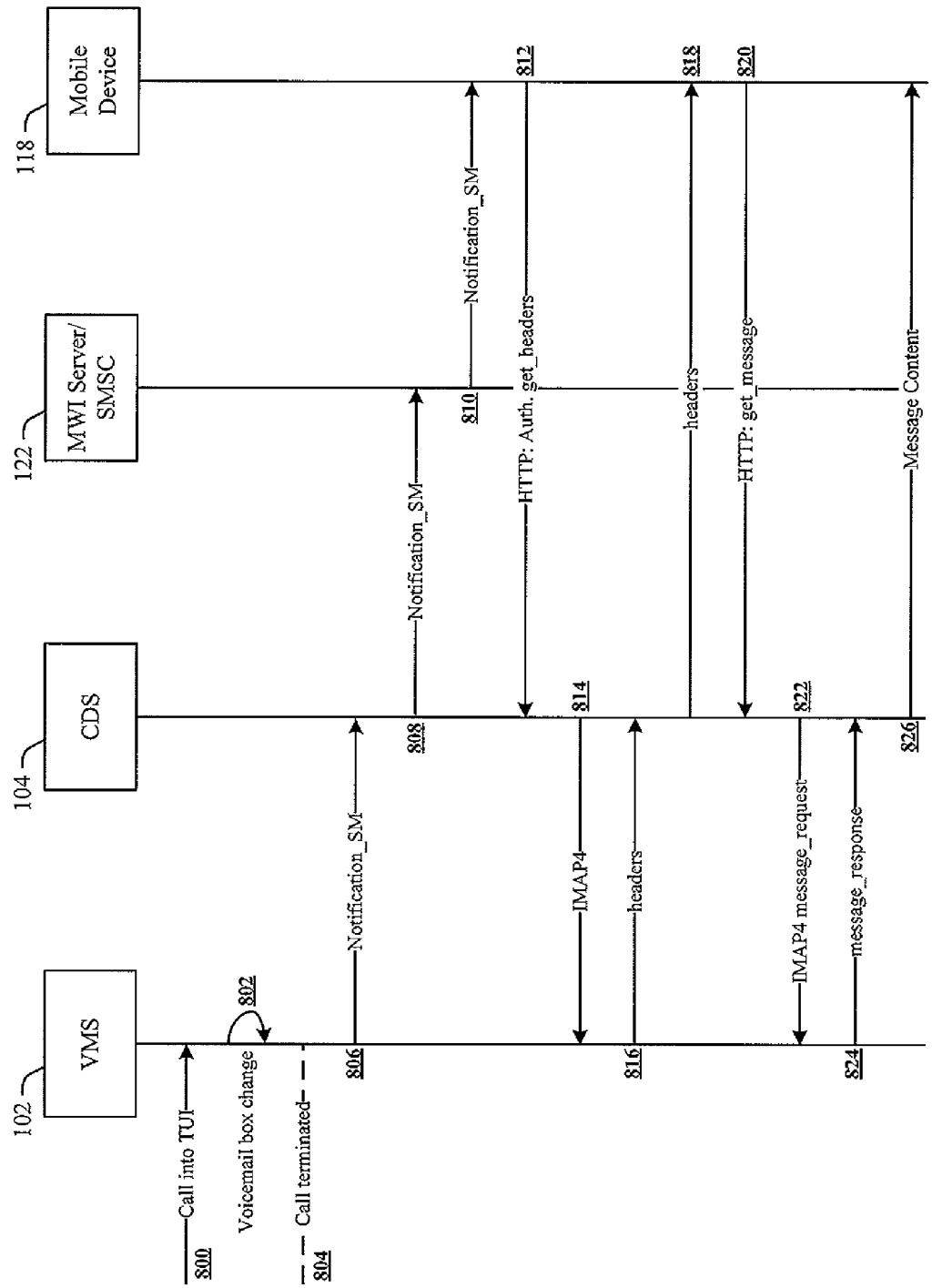
FIG. 8 is an exemplary message flow diagram illustrating a process for telephone user interface access management, according to the present disclosure.

Referring now to FIG. 8, an exemplary process for TUI management is illustrated, according to the present disclosure. The following process is for the scenario in which a subscriber accesses the TUI 109 via a landline, the MD 118, or another MD. The process can begin at step 800, wherein the subscriber places a call to the VMS 102 using the TUI 109. After the subscriber is granted access to his or her mailbox, the user can listen to, skip, or delete any message. A voicemail box change can occur at step 802. The subscriber can terminate the call, at step 804. In response to the subscriber exiting the voicemail box, the VMS 102 can generate a notification_SM message that can be sent to the CDS 104, at step 806. The notification_SM message can include the content as described above. At step 808, the notification_SM message can be forwarded to the SMSC 122. The SMSC 122, in turn, can forward the message to the MD 118, at step 810. At step 812, the MD 118 can receive the notification_SM message and generate an HTTP get_headers message that can be sent to the CDS 104. The MD 118 can use the get_headers message to determine what voicemail information has changed. At step 814, the CDS 104 can initiate an IMAP session with the VMS 102. A TCP connection can be established and the get_headers message can be used to authenticate the session. The subscriber's voicemail box can be accessed on the VMS 102 to retrieve the header information for the voicemail messages. The VMS 102 can send the headers to the CDS 104, at step 816. The CDS 104 can forward the headers to the MD 118, at step 818. The MD 118 can use the headers to determine if any voicemail box change(s) have occurred. After the MD 118 determines the message(s) that need to be retrieved, the MD 118 can generate and send an HTTP message get_message with the header information for the requested message(s), at step 820. At step 822, the get_message message can be received and the CDS 104 can generate and send an IMAP message_request to the VMS 102. The IMAP message_request can include the requested voicemail message header information The VMS 102 can process the request and return the requested message content in an IMAP message_response, at step 824. The CDS 104 can deliver the message content, at step 826. Upon receipt of the message content, the MD 118 can store the content under the appropriate header in a memory (see FIG. 10) and permit the subscriber to access the content via a VVM application GUI.

In some embodiments, a subscriber can be provisioned to switch between a POVM system and a VVM system upon demand. For example, when traveling internationally, a subscriber may desire to switch to POVM to avoid higher data rate charges for use of VVM service.

Figure 9:
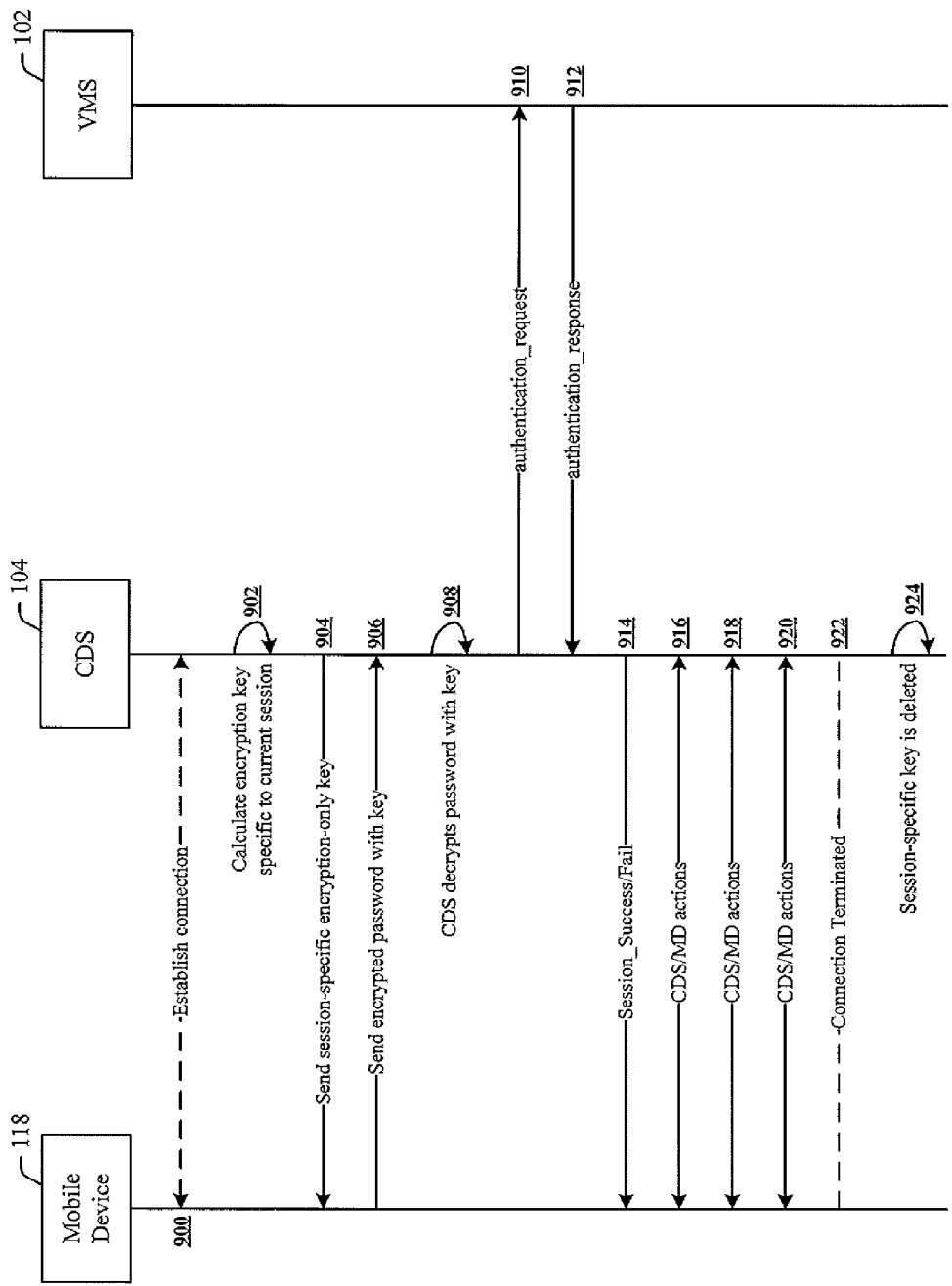
FIG. 9 is an exemplary message flow diagram illustrating a process for password encryption, according to the present disclosure.

Referring now to FIG. 9, a process for password encryption is illustrated, according to the present disclosure. The process can begin at step 900 and the MD 118 can establish a connection with the CDS 104. The CDS 104 can calculate an encryption key that is specific to the current session, at step 902. At step 904, the CDS 104 can send the session-specific encryption key to the MD 118. The MD 118 can receive the encryption key and response with an HTTP request to the CDS 104 with encrypted password and a decryption key, at step 906. If the session is intended for a password change process, the old and new passwords can be sent. At step 908, the CDS 104 can receive and decrypt the password with the decryption key. The CDS 104 can generate an authentication_request to authenticate the password. The authentication_request can be sent to the VMS 102, at step 910. At step 912, the VMS 102 can respond with an authentication_response indicating the success or failure of the authentication. The CDS 104 can receive the authentication_response and generate a session_success/fail message. The session_success/fail message can be sent to the MD 118, at step 914. Assuming a successful authentication, the MD 118 and CDS 104 can conduct any of the aforementioned processes during CDS/MD actions 916, 918, 920. The connection can be terminated at step 922 if, for example, the MD 118 closes the connection, there is a connection timeout between the MD 118 and the CDS 104, or the initial authentication fails. After connection is terminated, the CDS 104 can delete the session-specific key, at step 924.

Figure 10:
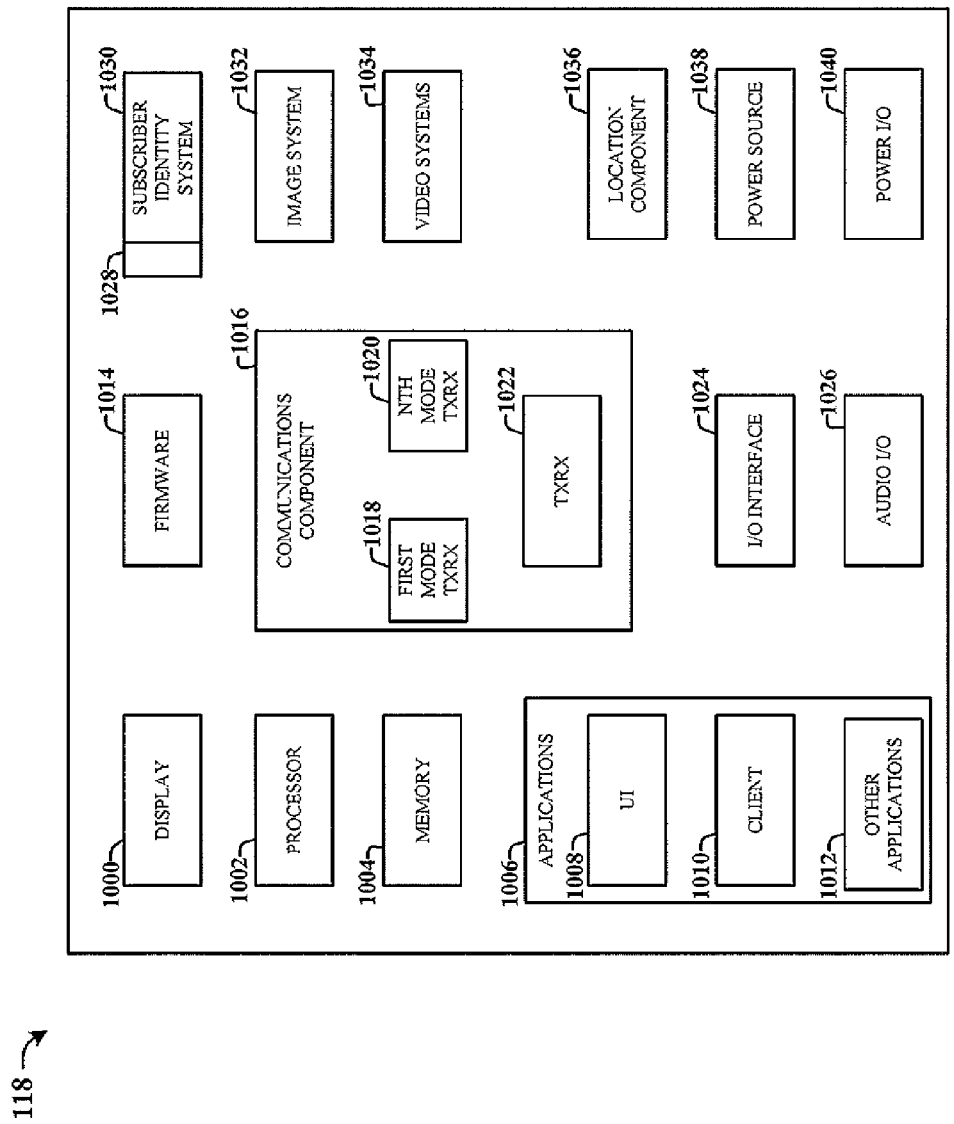
FIG. 10 illustrates an exemplary mobile device and components thereof, according to the present disclosure.

FIG. 10 is a schematic block diagram illustrating an exemplary MD 118 for use in accordance with an exemplary embodiment of the present disclosure. Although no connections are shown between the components illustrated and described in FIG. 10, the components can interact with each other to carry out device functions.

As illustrated, the MD 118 can be a multimode handset. FIG. 10 and the following discussion are intended to provide a brief, general description of a suitable environment in which the various aspects of an embodiment of the present disclosure can be implemented. While the description includes a general context of computer-executable instructions, the present disclosure can also be implemented in combination with other program modules and/or as a combination of hardware and software.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 118 includes a display 1000 for displaying multimedia such as, for example, text, images, video, telephony functions, such as, visual voicemail data, caller line ID data, setup functions, menus, music metadata, messages, wallpaper, graphics, and the like. The display 1000 finds particular application in the present disclosure for displaying visual voicemail data in visual voicemail headers. The visual voicemail headers can include the date, time, CLI data, message length, and message status (i.e., new-unread, read, saved, or deleted).

The device 118 can include a processor 1002 for controlling, and/or processing data. A memory 1004 can interface with the processor 1002 for the storage of data and/or applications 1006. The memory 1004 can include a variety of computer readable media, including volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 118.

The memory 1004 can be configured to store one or more applications 1006, such as, for example, video player software, user feedback component software, combinations thereof, and the like. The applications 1006 can also include a user interface (UI) application 1008. The UI application 1008 can interface with a client 1010 (e.g., an operating system) to facilitate user interaction with device functionality and data, for example, answering/initiating calls, entering/deleting data, configuring settings, address book manipulation, multimode interaction, and the like. The applications 1006 can include other applications 1012 such as, for example, visual voicemail software, add-ons, plug-ins, voice recognition software, call voice processing, voice recording, messaging, e-mail processing, video processing, image processing, music play, combinations thereof, and the like, as well as subsystems and/or components. The applications 1006 can be stored in the memory 1004 and/or in a firmware 1014, and can be executed by the processor 1002. The firmware 1014 can also store code for execution during initialization of the device 118.

A communications component 1016 can interface with the processor 1002 to facilitate wired/wireless communications with external systems including, for example, cellular networks, VoIP networks, LAN, WAN, MAN, PAN, that can be implemented using WiFi, WiMax, combinations and/or improvements thereof, and the like. The communications component 1016 can also include a multimode communications subsystem for providing cellular communications via different cellular technologies. For example, a first cellular transceiver 1018 can operate in one mode, for example, GSM, and an Nth transceiver 1020 can operate in a different mode, for example WiFi. While only two transceivers 1018, 1020 are illustrated, it should be appreciated that a plurality of transceivers can be included. The communications component 1016 can also include a transceiver 1022 for unlicensed RF communications using technology such as, for example, WiFi, WiMAX, NFC, other RE and the like. The transceiver 1022 can also be configured for line-of-sight technologies, such as, for example, infrared and IRDA. Although a single transceiver 1022 is illustrated multiple transceivers for unlicensed RF and line-of-sight technologies are contemplated.

The communications component 1016 can also facilitate communications reception from terrestrial radio networks, digital satellite radio networks, Internet-based radio services networks, combinations thereof, and the like. The communications component 1016 can process data from a network, such as, for example, the Internet, a corporate intranet, a home broadband network, and the like, via an ISP, DSL provider, or other broadband service provider.

An input/output (I/O) interface 1024 can be provided for input/output of data and/or signals. The I/O interface 1024 can be a hardwire connection, such as, for example, a USB, PS2, IEEE 1394, serial, parallel, IEEE 802.3 (e.g., Ethernet—RJ45, RJ48), traditional telephone jack (e.g., RJ11, RJ14, RJ25) and the like, and can accept other I/O devices, such as, for example, a keyboard, keypad, mouse, interface tether, stylus pen, printer, plotter, jump/thumb drive, touch screen, touch pad, trackball, joy stick, controller, monitor, display, LCD, combinations thereof, and the like.

Audio capabilities can be provided by an audio I/O component 1026 that can include a speaker (not shown) for the output of audio signals and a microphone (not shown) to collect audio signals.

The device 118 can include a slot interface 1028 for accommodating a subscriber identity system 1030, such as, for example, a SIM or universal SIM (USIM). The subscriber identity system 1030 instead can be manufactured into the device 118, thereby obviating the need for a slot interface 1028.

The device 118 can include an image capture and processing system 1032. Photos and/or videos can be obtained via an associated image capture subsystem of the image system 1032, for example, a camera. The device 118 can also include a video systems component 1034 for processing, recording, and/or transmitting video content.

A location component 1036 can be included to send and/or receive signals, such as, for example, GPS data, assisted GPS data, triangulation data, combinations thereof, and the like. The device 118 can use the received data to identify its location or can transmit data used by other devices to determine the device 118 location.

The device 118 can include a power source 1038 such as batteries and/or other power subsystem (AC or DC). The power source 1038 can be single-use, continuous, or rechargeable. In the case of the latter, the power source 1038 call interface with an external power system or charging equipment via a power I/O component 1040.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A non-transitory computer-readable medium having stored thereon computer-executable instructions that, when executed by a processor, cause the processor to perform operations comprising:
   receiving a notification message from a visual voicemail system, the notification message comprising a security token for use by a mobile device to establish a secure data channel over which to provide a voicemail greeting to the visual voicemail system;
   receiving a user input to initiate recording of the voicemail greeting;
   receiving an audio input;
   recording the audio input as the voicemail greeting for a voicemail account associated with the mobile device;
   storing the recorded voicemail greeting at the mobile device;
   generating, in response to the voicemail greeting being stored at the mobile device, a request comprising the recorded voicemail greeting, a network address for the visual voicemail system, and instructions to set the voicemail greeting as an active voicemail greeting for the voicemail account;
   establishing the secure data channel to the visual voicemail system using the security token;
   transmitting, over the secure data channel, the request from the mobile device to the visual voicemail system using the network address; and
   receiving a response to the request from the visual voicemail system, the response comprising an indication of whether the voicemail greeting was set as the active voicemail greeting.

2. The non-transitory computer-readable medium of claim 1, wherein generating the request comprises generating a "ChangeGreeting" Hypertext Transfer Protocol request comprising the recorded voicemail greeting in a Multipurpose Internet Mail Extensions message body, the network address for the visual voicemail system, and the instructions to set the voicemail greeting as the active voicemail greeting for the voicemail account.

3. The non-transitory computer-readable medium of claim 1, wherein the notification message further comprises a hostname and a port number for the visual voicemail system.

4. The non-transitory computer-readable medium of claim 1, wherein recording the audio input as the voicemail greeting for the voicemail account associated with the mobile device comprises recording the audio input as a default voicemail greeting for the voicemail account associated with the mobile device.

5. The non-transitory computer-readable medium of claim 1, wherein recording the audio input as the voicemail greeting for the voicemail account associated with the mobile device comprises recording the audio input as a contact-specific voicemail greeting for the voicemail account associated with the mobile device.

6. The non-transitory computer-readable medium of claim 1, wherein:
   the user input is a first user input; and
   the method further comprises receiving a second user input to change the active voicemail greeting to a prerecorded voicemail greeting.

7. A mobile device comprising:
   a processor; and
   a memory, in communication with the processor, the memory having stored thereon a visual voicemail application that, when executed by the processor, cause the processor to perform operations comprising
      receiving a notification message from a visual voicemail system, the notification message comprising a security token for use by a mobile device to establish a secure data channel over which to provide a voicemail greeting to the visual voicemail system,
      receiving a user input to initiate recording of a voicemail greeting,
      receiving an audio input,
      recording the audio input as the voicemail greeting for a voicemail account associated with the mobile device,
      storing the recorded voicemail greeting in the memory,
      generating a request, in response to the voicemail greeting being stored, the request comprising the recorded voicemail greeting, a network address for the visual voicemail system, and instructions to set the voicemail greeting as an active voicemail greeting for the voicemail account,
      establishing the secure data channel to the visual voicemail system using the security token,
      transmitting, over the secure data channel, the request to the visual voicemail system using the network address, and
      receiving a response to the request from the visual voicemail system, the response comprising an indication of whether the voicemail greeting was set as the active voicemail greeting.

8. The mobile device of claim 7, wherein the visual voicemail application, when executed by the processor, causes the processor to generate generates a "ChangeGreeting" Hypertext Transfer Protocol request comprising the recorded voicemail greeting in a Multipurpose Internet Mail Extensions message body, the network address for the visual voicemail system, and instructions to set the voicemail greeting as the active voicemail greeting for the voicemail account.

9. The mobile device of claim 7, wherein the notification message further comprises a hostname and a port number for the visual voicemail system.

10. The mobile device of claim 7, wherein the visual voicemail application, in causing the processor to record the audio input, causes the processor to record the audio input as a default voicemail greeting for the voicemail account associated with the mobile device.

11. The mobile device of claim 7, wherein the visual voicemail application, in causing the processor to record the audio input, causes the processor to record the audio input as a contact-specific voicemail greeting for the voicemail account associated with the mobile device.

12. A visual voicemail system comprising:
   a processor; and
   a memory, in communication with the processor, the memory having stored thereon computer-executable instructions that, when executed by the processor, cause the processor to perform operations comprising:

generating a notification message directed to a mobile device, the notification message comprising a security token for use by the mobile device to establish a secure data channel over which to provide a voicemail greeting to the visual voicemail system, sending the notification message to the mobile device, receiving a request from the mobile device over the secure data channel established by the mobile device using the security token, the request comprising a voicemail greeting that was recorded at the mobile device, a network address for the visual voicemail system, and instructions to set the voicemail greeting as an active voicemail greeting for a voicemail account associated with the mobile device, attempting to set the voicemail greeting as the active voicemail greeting for the voicemail account according to the instructions to set the voicemail greeting as the active voicemail greeting, and generating a response to the request, the response comprising an indication of whether the voicemail greeting was set as the active voicemail greeting.

13. The system of claim 12, wherein the instructions, when executed by the processor, further cause the processor to set the recorded voicemail greeting as the active voicemail greeting for the voicemail account prior to generating the response to the request.

14. The system of claim 12, wherein the instructions, when executed by the processor, cause the processor to, in receiving the request, receive a "ChangeGreeting" Hypertext Transfer Protocol request comprising the recorded voicemail greeting in a Multipurpose Internet Mail Extensions message body, and instructions to set the voicemail greeting as the active voicemail greeting for the voicemail account.

15. The system of claim 12, wherein the notification message further comprises a hostname and a port number for the visual voicemail system.

* * * * *